United States Patent
Hsueh

(10) Patent No.: US 8,804,853 B2
(45) Date of Patent: Aug. 12, 2014

(54) SIGNAL EXTENDER SYSTEM AND SIGNAL EXTENDER THEREOF

(75) Inventor: Chao-Hsuan Hsueh, Taipei (TW)

(73) Assignee: Aten International Co., Ltd., Shijr (TW)

( * ) Notice: Subject to any disclaimer, the term of this patent is extended or adjusted under 35 U.S.C. 154(b) by 231 days.

(21) Appl. No.: 13/253,686

(22) Filed: Oct. 5, 2011

(65) Prior Publication Data

US 2012/0082249 A1 Apr. 5, 2012

(30) Foreign Application Priority Data

Oct. 5, 2010 (TW) ............................... 99133882 A

(51) Int. Cl.
*H04B 3/00* (2006.01)
*H04L 7/00* (2006.01)
*H04L 1/18* (2006.01)

(52) U.S. Cl.
CPC ............. *H04L 7/0083* (2013.01); *H04L 1/1854* (2013.01); *H04L 7/0008* (2013.01)
USPC ........................................................ 375/257

(58) Field of Classification Search
USPC ........................................................ 375/257
See application file for complete search history.

(56) References Cited

U.S. PATENT DOCUMENTS

| | | | |
|---|---|---|---|
| 2004/0015991 | A1 | 1/2004 | Thornton |
| 2007/0005841 | A1 | 1/2007 | Lin et al. |
| 2008/0117994 | A1 | 5/2008 | Shetty |
| 2008/0247341 | A1* | 10/2008 | Lee .............................. 370/294 |

(Continued)

FOREIGN PATENT DOCUMENTS

| | | |
|---|---|---|
| CN | 101409816 | 4/2009 |
| CN | 101489075 | 7/2009 |
| CN | 101595701 | 12/2009 |
| CN | 101729790 | 6/2010 |

OTHER PUBLICATIONS

Avenview Audio Video Company, "HDMI 1. 3 Extender Set Over Single CAT5", http://www.avenview.com/hdmi-13-extender-set-over-single-cat5-p-1500.html, 3 pages, printed from the internet on Mar. 19, 2011.

Beacon Computer Inc., "50M/150ft CAT6 HDMI (1080p) Extender Kit, Model No. AVK-820HS", http://www.avextender.com/...plang=2&customer_id=1620&name_id=51167&rid=16107&id=151175&gclid=CJPIwfv-26cCFcE65QodN0rN8w, 4 pages, printed from the internet on Mar. 19, 2011.

(Continued)

*Primary Examiner* — Santiago Garcia
(74) *Attorney, Agent, or Firm* — Chen Yoshimura LLP

(57) ABSTRACT

A signal extender system including a first electronic apparatus, a second electronic apparatus, and a signal extender. The signal extender system includes a transmission module, a receiving module, and pairs of differential transmission lines. The receiving module includes a timing memory unit. The transmission module receives a digital image differential signal including differential data signals, a differential timing signal, and a two-way differential signal. A first pair of differential transmission lines, a second pair of differential transmission lines, and a third pair of differential transmission lines of the pairs of differential transmission lines transmit the differential data signals respectively. A fourth pair of differential transmission lines alternately transmits the two-way differential signal and a part of differential timing signal. The timing memory unit memories and continually replicates the part of differential timing signal to recover the differential timing signal and output it to the second electronic apparatus.

35 Claims, 10 Drawing Sheets

(56) References Cited

U.S. PATENT DOCUMENTS

| | | |
|---|---|---|
| 2009/0049498 A1 | 2/2009 | Li |
| 2009/0052208 A1* | 2/2009 | Li ................................... 363/13 |
| 2009/0238212 A1 | 9/2009 | Roethig et al. |
| 2010/0011143 A1 | 1/2010 | Chang et al. |
| 2010/0111100 A1 | 5/2010 | Baumer |
| 2010/0135657 A1* | 6/2010 | Eddleston et al. .............. 398/44 |
| 2010/0215118 A1* | 8/2010 | Ware et al. ................... 375/295 |
| 2011/0181558 A1* | 7/2011 | Jeon et al. .................... 345/204 |
| 2011/0193598 A1* | 8/2011 | Bhakta et al. ................. 327/141 |
| 2011/0194595 A1 | 8/2011 | Shetty |
| 2011/0221518 A1* | 9/2011 | Romero ........................ 327/554 |
| 2011/0267212 A1* | 11/2011 | Denison ........................ 341/122 |
| 2013/0044845 A1* | 2/2013 | Zerbe ............................ 375/360 |

OTHER PUBLICATIONS

Hall Research Inc., "UH-1C, HDMI over a Single CAT5e/6 Reclocking Extender (Sender and Receiver)" http://www.hallresearch.com/page/Products/UH-1C, 2 pages, printed from the internet on Mar. 19, 2011, Tustin CA.

Chinese Office Action, dated Apr. 22, 2013, in a counterpart Chinese patent application, No. CN 201110317885.4.

* cited by examiner

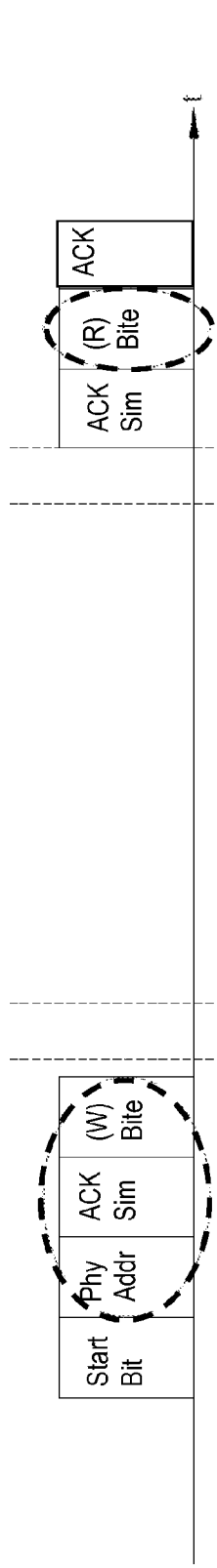
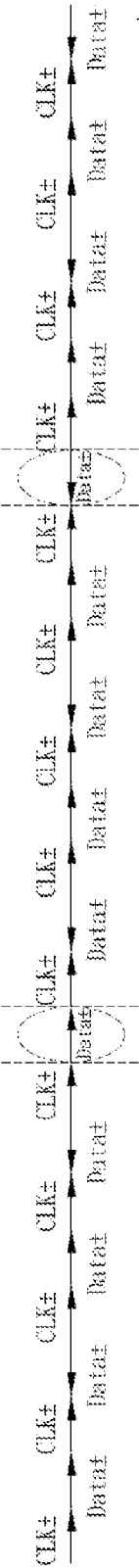
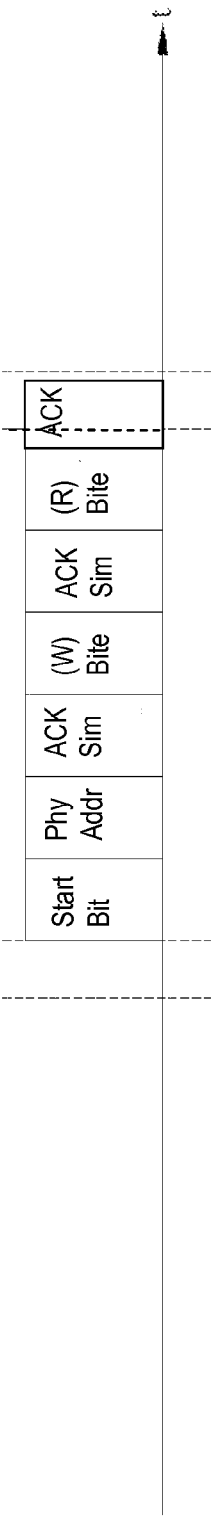
FIG. 7a
FIG. 7b
FIG. 7c

SIGNAL EXTENDER SYSTEM AND SIGNAL EXTENDER THEREOF

BACKGROUND OF THE INVENTION

1. Field of the Invention

This invention relates to digital data signal transmission, and in particular, it relates to a signal extender system for transmitting digital data signals with a single cable.

2. Description of the Related Art

In recent years, with the constant evolution of electronic technology, multimedia audio-visual (A/V) technology has developed very rapidly. One example is the High Definition Multimedia Interface (HDMI) used for integrated A/V signal transmission. Since a single HDMI cable can be used for transmitting non-compressed audio signals and high resolution video signals, there is no need to convert analog into digital (A/D) signals or digital into an analog signal (D/A), so the A/V signals can be transmitted without distortion.

Referring to FIG. 1a, there is shown at 100 a typical conventional arrangement for transmitting A/V signals between a signal source device 110 and a signal sink (target) device 120. The signal source 110 has an HDMI output terminal 112, and the signal sink 120 has an HDMI input terminal 122. For short local distance transmission, an HDMI cable 132 may be used to directly couple HDMI terminals 112 and 122 for transmitting A/V signals from the source 110 to sink 120. The major limitation of this arrangement is the short distance between the source 110 and sink 120, as HDMI cables are usually very bulky and expansive and only made in a length of a few feet.

Referring to FIG. 1b, there is shown at 102 another conventional arrangement for transmitting audio-video (A/V) signals such as digital visual interface (DVI) or HDMI, utilizing two Category 5 (CAT-5) cables for longer distance transmission between the source 110 and sink 120. A signal extender 140 is provided between the source 110 and sink 120. The extender 140 includes a transmitting (TX) module 150 and a receiving (RX) module 160. The TX module 150 has an A/V input terminal 152 and two CAT-5 output terminals 154 and 156. The RX module 160 has an A/V output terminal 162 and two CAT-5 input terminals 164 and 166.

An A/V cable 132 is coupled between A/V terminals 112 and 152 to connect the source 110 and the TX module 150, and another A/V cable 132' is coupled between A/V terminals 162 and 122 to connect the RX module 160 and sink 120. Two CAT-5 twisted pair cables 174 and 176 are used to connect TX module 150 and RX module 160, wherein CAT-5 cable 174 is coupled between CAT-5 terminals 154 and 164, and CAT-5 cable 176 is coupled between CAT-5 terminals 156 and 166.

However, there are still major limitations with this arrangement. First, the transmission distance is still relatively short. For example, for transmitting 1,080P digital image differential signal, since the video image has a high resolution of 1,920×1,080 (with 1,080 horizontal lines) which requires a relatively larger bandwidth of about 1.86 Gbps, CAT-5 cables can only reliably transmit 1,650 MHz differential signal for about 120 ft. When an HDMI source and an HDMI sink are located further away, the signal extender system for transmitting A/V signals from the source to the sink usually needs to incorporate one or more repeaters in its design.

Second, a CAT-5 twisted pair cable has only four (4) pairs of differential transmission lines, which are merely enough for transmitting differential data signals. However, other control signals provided by the A/V source 110, including the inter-integrated circuit (I2C) signal, the Consumer Electronic Control (CEC) signal, the Hot Plug Detect (HPD) signal and the power supply signal VDD, must also be transmitted to the sink 120. In addition, the I2C is a bi-directional signal not suitable to be carried by the one-way differential data signal. As a result, two CAT-5 cables 174 and 176 must be used so that both differential data signal and other control signals (e.g., I2C/CEC/HPD/VDD) can be transmitted between the TX module 150 and RX module 160.

Referring to FIG. 1c, the data signals transmitted from the source 110 to the TX module 150 by the A/V cable 132 includes digital A/V differential data signals D0±, D1±, D2±, differential clock signal CLK±, and other control signals such as I2C, HPD, VDD and CEC signals. The two CAT-5 cables 174 and 176 coupled between the TX module 250 and the RX module 260 each has four pairs of differential transmission lines L1, L2, L3 and L4. The four pairs of differential transmission lines L1, L2, L3 and L4 of the first CAT-5 cable 174 may be used for transmitting differential data signals D0±, D1±, D2± and differential clock signal CLK±. The four pairs of differential transmission lines L1, L2, L3 and L4 of the second CAT-5 cable 176 are used for transmitting the other control signals I2C/HPD/VDD/CEC. Therefore two CAT-5 cables are needed conventionally.

There is a need to have an improved signal extender system that can use a single signal cable for carrying digital multimedia signals from a source device and transmit the digital multimedia signals in longer distance.

SUMMARY OF THE INVENTION

The following summary extracts and compiles some of the features of the present invention, while other features will be disclosed in the follow-up detailed descriptions of the invention. It is intended to cover various modifications and similar arrangements included within the spirit and scope of the appended claims.

It is an object of the present invention to provide a signal extender system for transmitting digital multimedia signals between multimedia terminals of a signal source and a signal sink in longer distance.

It is another object of the present invention to provide a signal extender system for transforming digital multimedia signals from a signal source into processed signals whereby the processed signals can be carried by a single signal cable, and for transmitting the digital multimedia signals between multimedia terminals of the signal source and a signal sink.

It is also an object of the present invention to provide a signal repeater for a signal extender system that can transmit digital multimedia signals between multimedia terminals of a signal source and a signal sink for a longer distance and with fewer signal cables.

In one embodiment the present invention provides a system for transmitting electronic signals from an electronic signal source device to an electronic signal sink device, comprising: a transmitting module coupled to the signal source device for receiving a digital audio-visual (A/V) differential signal that includes multiple differential data signals, a differential clock signal and at least one bi-directional (BD) differential signal; a receiving module coupled to the signal sink device and having a timing memory unit; and a single category-5 (CAT-5) cable coupled between the transmitting and receiving modules and having four pairs of differential transmission lines; wherein the transmitting module transmits the multiple differential data signals over the first three pairs of differential transmission lines, and alternatively transmits the at least one BD differential signal and a partial differential clock signal which is part of the differential clock signal over the fourth pair of differential transmission lines; wherein the timing memory unit of the receiving module memorizes the partial differential clock signal received by the receiving module, and continuously replicates the partial differential clock signal to revert a complete differential clock signal from the received differential clock signal and the replicated partial differential clock signal for output to the sink device.

In a practical implementation of the present invention, the transmitting module of the signal extender comprises a differential signal processing unit coupled to the source device and the first three pairs of differential transmission lines of the single CAT-5 cable, for receiving the multiple differential data signals and the differential clock signal from the source device and processing the multiple differential data signals, and transmitting the processed multiple differential data signals over the first three pairs of differential transmission lines; a signal sampling unit coupled to the source device, for receiving the differential clock signal and the at least one BD differential signal from the source device and sampling the at least one BD differential signal based on the differential clock signal; and a channel switching unit coupled to the differential signal processing unit, the signal sampling unit and the fourth pair of the differential transmission lines of the single CAT-5 cable, for receiving the differential clock signal form the differential signal processing unit and receiving the BD differential signal from the signal sampling unit, and alternatively switching between the partial differential clock signal and the BD differential signal and transmitting the partial differential clock signal and the BD differential signal over the fourth pair of the differential transmission lines.

In the practical implementation of the present invention, the receiving module comprises: a channel switching unit coupled to the timing memory unit and the fourth pair of the differential transmission lines of the single CAT-5 cable, for receiving the partial differential clock signal and the BD differential signal, and sending the partial differential clock signal to the timing memory unit such that the timing memory unit can memorize the partial differential clock signal and continuously replicate the partial differential clock signal to revert the complete differential clock signal; a differential signal processing unit coupled to the sink device, the timing memory unit and the first three pairs of differential transmission lines of the single CAT-5 cable, for receiving the reverted differential clock signal from the timing memory unit and receiving the multiple differential data signals from the first three pairs of differential transmission lines and processing the multiple differential data signals, and outputting the multiple differential data signals and the reverted differential clock signal to the sink device; and a signal sampling unit coupled to the sink device, the channel switching unit and the timing memory unit, for receiving at least one the BD differential signal from the channel switching unit and receiving the reverted differential clock signal from the timing memory unit and sampling the at least one BD differential signal based on the reverted differential clock signal, and outputting the at least one BD differential signal to the sink device.

In another embodiment the present invention provides a system for transmitting electronic signals from an electronic signal source device to an electronic signal sink device, comprising: a transmitting module coupled to the signal source device for receiving a digital audio-visual (A/V) differential signal that includes multiple differential data signals, a differential clock signal and at least one bi-directional (BD) differential signal; a receiving module coupled to the signal sink device and having a timing memory unit; a repeater coupled between the transmitting module and the receiving module, and having an internal receiving module and an internal transmitting module coupled to each other; the receiving module and the internal receiving module of the repeater each having a timing memory unit; a first category-5 (CAT-5) cable coupled between the transmitting module and the internal receiving module of the repeater; a second CAT-5 cable coupled between the internal transmitting module of the repeater and the receiving module; and each CAT-5 cable having four pairs of differential transmission lines; wherein the transmitting module and the internal transmitting module of the repeater transmit the multiple differential data signals over the first three pairs of differential transmission lines, and alternatively transmit the at least one BD differential signal and a partial differential clock signal which is part of the differential clock signal over the fourth pair of differential transmission lines; and wherein the respective timing memory unit of the receiving module and the internal receiving module of the repeater memorizes the partial differential clock signal received and continuously replicates the partial differential clock signal to revert a complete differential clock signal from the received deferential clock signal and the replicated partial differential clock signal.

The transmitting module and the internal transmitting module of the repeater have similar design, construction and functions as summarized above. The receiving module and the internal receiving module of the repeater have similar design, construction and functions as summarized above.

The signal extender system and signal extender thereof according to the present invention are advantageous over existing technologies. It requires only one CAT-5 cable between a TX module and an RX module of the extender system for transmitting HDMI A/V signals by sharing the fourth pair of transmission lines of the single CAT-5 cable with alternating transmission of the BD differential signals and a partial differential clock signal, and utilizes a timing memory unit to memorize the partial differential clock signal and continuously replicate the partial differential clock signal to revert the complete differential clock signal for output to the sink. This significantly simplifies the extender system and reduces the costs for HDMI A/V signal transmission. In addition, it provides a quick and easy way to extend the distance of HDMI A/V signal transmission by providing a series of repeaters between the TX and Rx modules of the extender system.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

FIG. 7a is a diagram illustrating the source I2C signal before processed by the TX module of the signal extender system of the present invention.

FIG. 7b is a diagram illustrating the signal transmitted by the CAT-5 cable of the signal extender system of the present invention.

FIG. 7c is a diagram illustrating the source I2C signal before processed by the RX module of the signal extender system of the present invention.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as other alternative embodiments) of the present invention.

Figure 2:
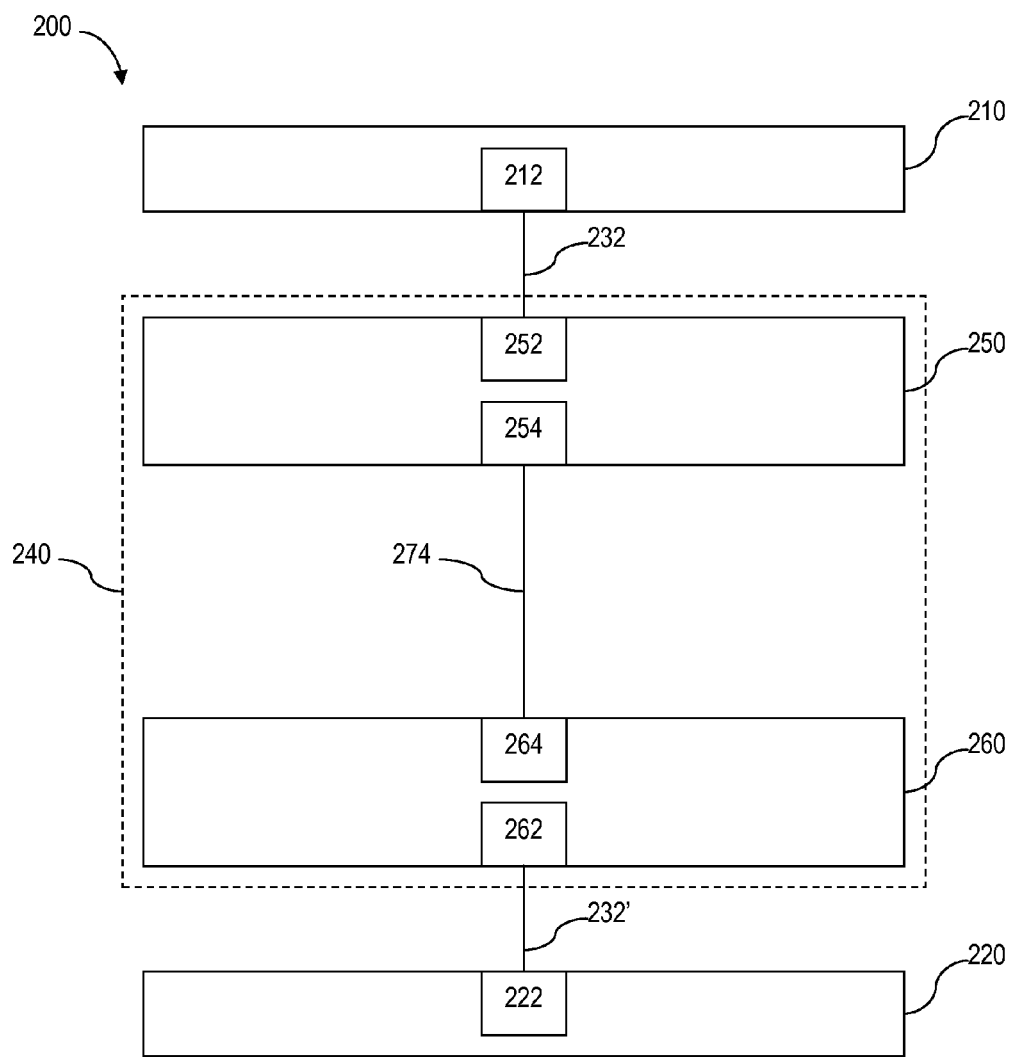
FIG. 2 is a block diagram illustrating one embodiment of the present invention HDMI signal extender system and extender thereof for transmitting digital A/V differential signals.

Referring to FIG. 2, there is shown at 200 an embodiment of the signal extender system for transmitting digital multimedia signals between a source 210 and a sink 220. The digital multimedia signals can be, but not limited to, digital A/V signals. For example, it could also be an audio signal or video signal. The source 210, for providing digital multimedia signals, has at least one digital signal output terminal such as an HDMI, DVI, or DisplayPort output terminal 212, wherein, in this embodiment, the digital signal output terminal is an HDMI output terminal. As an example, the source 210 may be a Blue-Ray® DVD player. The sink 220, for receiving digital multimedia signals, has at least one digital multimedia signal input terminal such as an HDMI, DVI, or DisplayPort input terminal 222, wherein, in this embodiment, the digital multimedia signal input terminal is an HDMI output terminal. As an example, the sink 220 may be, but not limited to, a high definition television (HDTV) set.

In this embodiment, a signal extender 240 is provided for extending the digital A/V differential signal transmission distance between the source 210 and sink 220. In this example, the signal extender 240 can be, but not limited to, an HDMI signal extender for the exemplary source 210 and sink 220 that have HDMI terminals 212 and 222 respectively. It is noted that the signal extender 240 can also be a DVI extender, or a DisplayPort extender. The signal extender 240 includes a TX module 250 and an RX module 260. The TX module 250 has an HDMI input terminal 252 and a single cable output interface 254 having a plurality pair of terminals. In this embodiment, the single cable output interface 254 is a CAT-5 cable output interface having four pair of terminals. The RX module 260 has an HDMI output terminal 262 and a single cable input interface 264. Correspondingly, the single cable input interface 264 is a CAT-5 cable input interface having four pair of terminals. An HDMI cable 232 is coupled between HDMI terminals 212 and 252 to connect the source 210 and the TX module 250, and another HDMI cable 232' is coupled between HDMI terminals 262 and 222 to connect the RX module 260 and sink 220. One CAT-5 cable 274 having four twisted pairs of differential transmission lines L1, L2, L3 and L4 is coupled between the CAT-5 interfaces 254 and 264 to connection the TX module 250 and RX module 260. Each pair of terminals of the interfaces 254 and 264 are coupled to each twisted pair of differential transmission lines. One aspect of the present invention is to implement a timing memory process for extending the transmission of A/V signals by using only one CAT-5 cable.

Figure 1A:
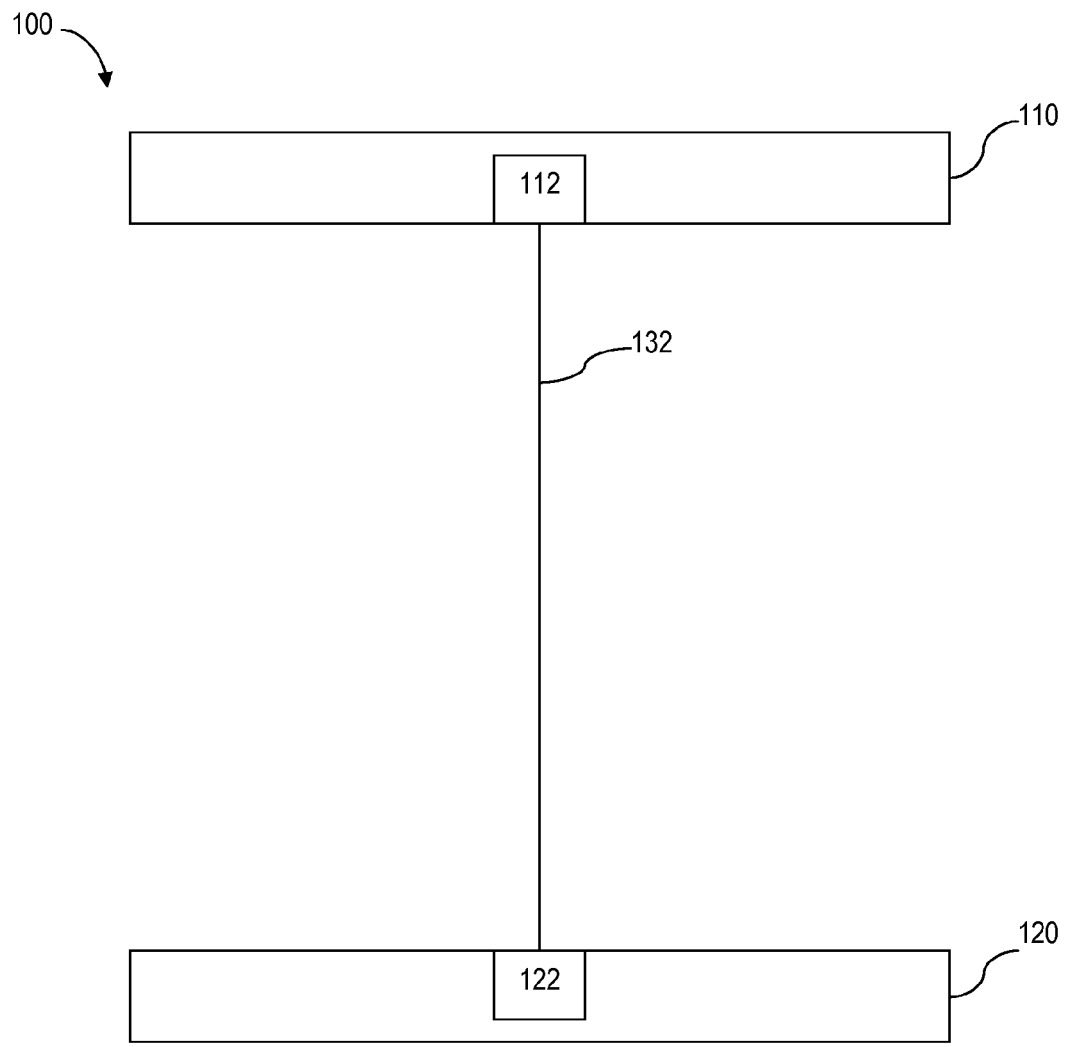
FIG. 1a is a block diagram illustrating a conventional arrangement for transmitting digital A/V differential signals between a signal source and a signal sink using an HDMI cable.
Figure 1B:
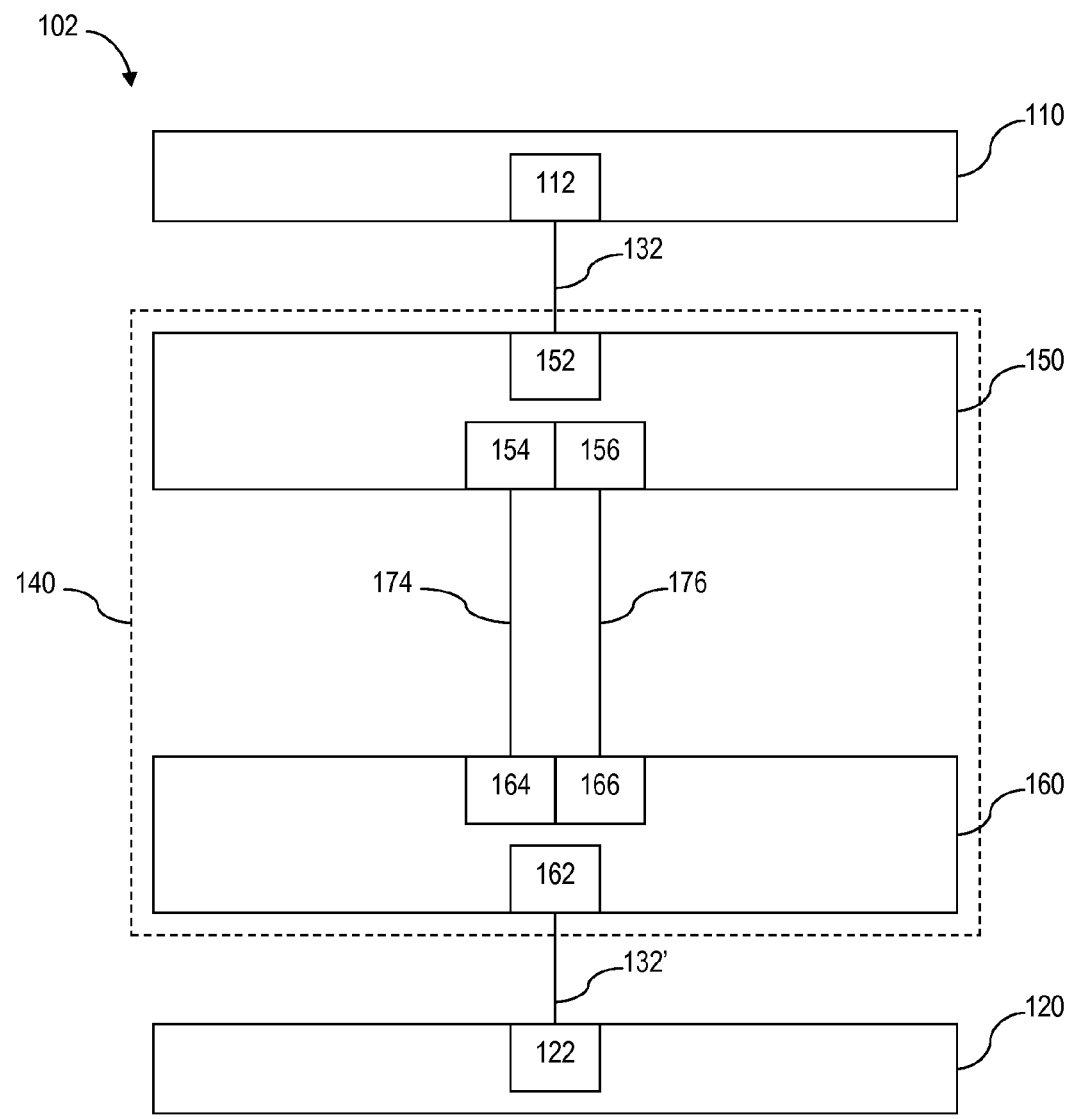
FIG. 1b is a block diagram illustrating a conventional HDMI signal extender arrangement for transmitting digital A/V differential signals between a source and a sink using CAT-5 cables.
Figure 1C:
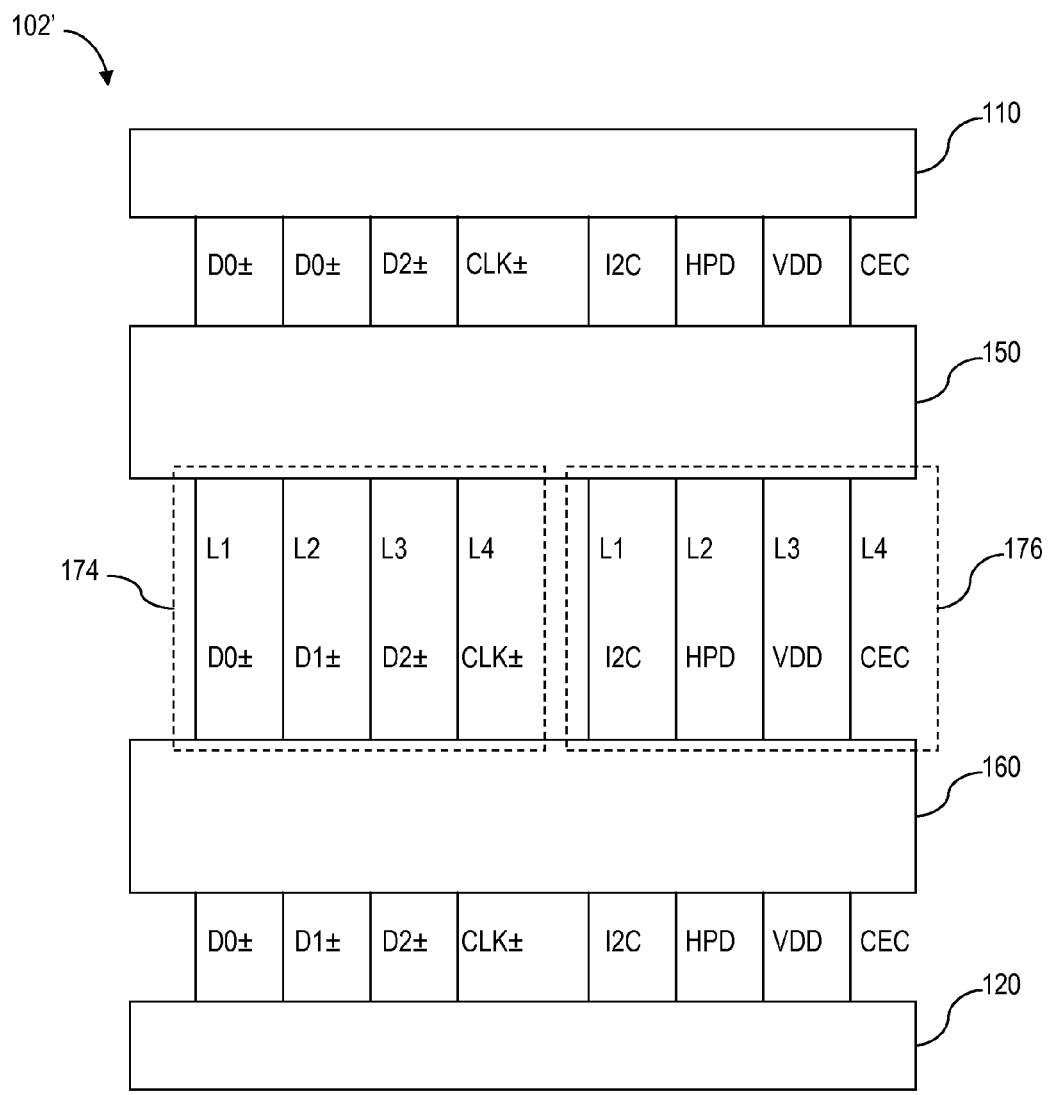
FIG. 1c is a block diagram illustrating data line assignment of the signal transmission in the conventional arrangement shown in FIG. 1b.
Figure 3:
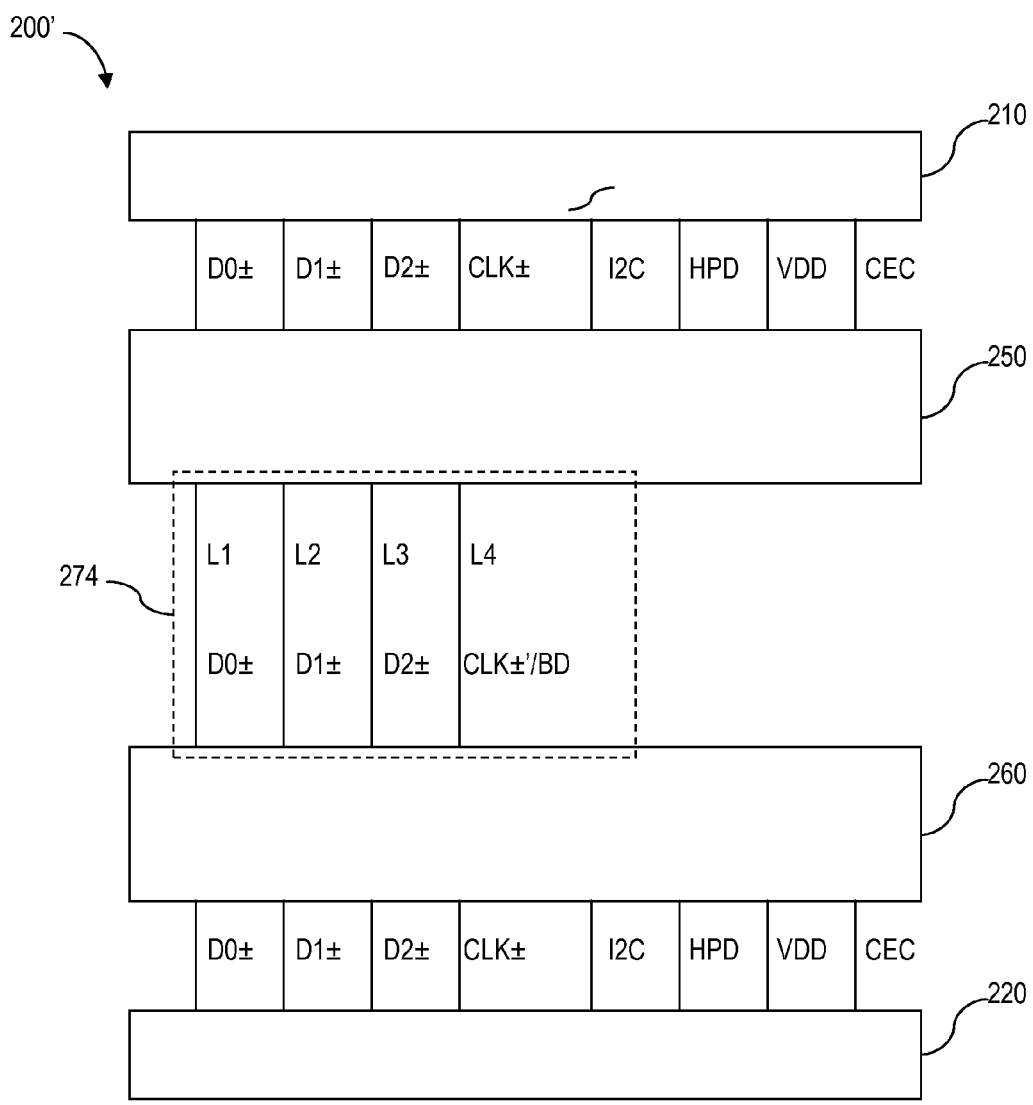
FIG. 3 is a block diagram illustrating data line assignment of the signal transmission in the present invention embodiment shown in FIG. 2.

Referring to FIG. 3, there is shown a block diagram illustrating data line assignment of the signal transmission in the signal extender system 200 shown in FIG. 2. The digital multimedia signals transmitted from the source 210 to the TX module 250 by the HDMI cable 232 includes digital A/V differential data signals D0±, D1±, D2±, differential clock signal CLK±, and other control signals such as bi-direction signal I2C, and one-way signal HPD, VDD and CEC signals, wherein HPD is a control signal from sink 220 to source 210, while the VDD and CEC are the signals from the source 210 to sink 220. All these control signals are transmitted between the TX module 250 to the RX module 260 by one CAT-5 cable 274 which has four twisted pairs of differential transmission lines L1, L2, L3 and L4. The first three pairs of differential transmission lines L1, L2 and L3 are used for transmitting differential data signals D0±, D1± and D2± respectively. In conventional arrangement (as shown in FIG. 1c) the fourth twisted pair of differential transmission lines L4 is used for transmitting differential clock signal CLK± only, and a second CAT-5 cable is needed for transmitting the other control signals such as bi-direction signal I2C, and one-way signals HPD, VDD and CEC. The present invention eliminates the second CAT-5 cable and uses only one CAT-5 cable 274 by sharing the fourth pair of differential transmission lines L4 between the differential clock signal CLK± and the control signals. In order to recover the differential clock signal, an embodiment implements a timing memory technique that alternatively transmits a partial differential clock signal CLK±' and the processed control signals on the fourth pair of differential transmission lines L4. Furthermore, the present invention utilizes a timing memory unit to memorize and replicate the partial differential clock signal CLK±' to revert the complete differential clock signal for output to the sink 220.

Figure 4:
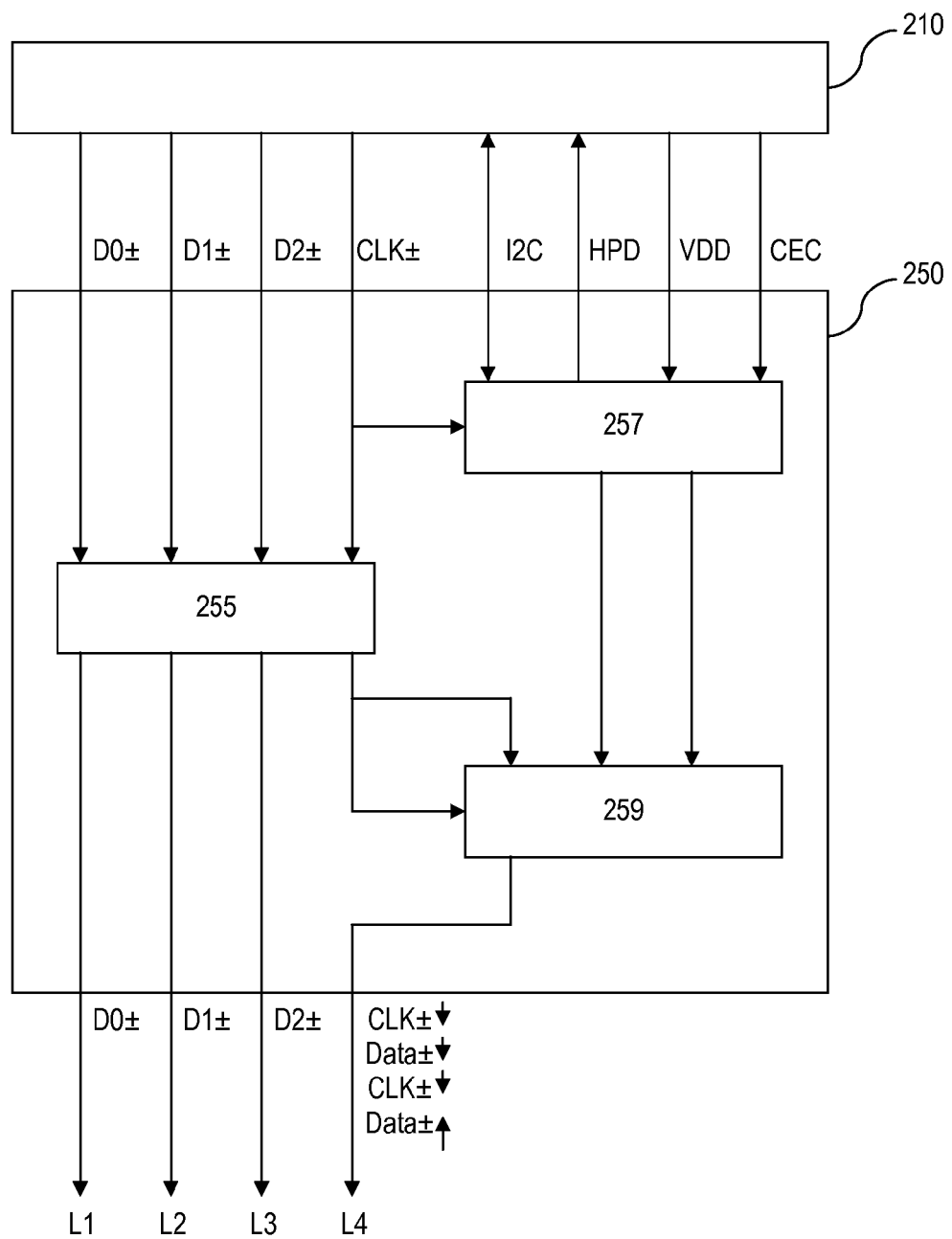
FIG. 4 is a block diagram illustrating an example of the TX module of the present invention embodiment shown in FIG. 2.

Referring to FIG. 4, there is shown a block diagram illustrating an example of the TX module 250 of the present invention embodiment shown in FIG. 2. TX module 250 has a Transition Minimized Differential Signaling (TMDS) processing unit 255, a control signal sampling/desampling unit 257 and a channel switching unit 259. The TMDS processing unit 255 may be a TMDS equalizer (EQ) or a TMDS high speed operational amplifier (OP) and is used for processing the differential data signals D0±, D1±, D2± and the differential clock signal CLK±. In this exemplary embodiment, the TMDS processing unit 255 is utilized to buffer the differential data signals D0±, D1±, D2± and the differential clock signal CLK±, and adjust the differential signal intensity for long distance transmission. From the TMDS processing unit 255, the differential data signals D0±, D1±, D2± are transmitted by the first three pairs of differential transmission lines L1, L2 and L3 of CAT-5 cable 274, but the differential clock signal CLK± is sent to the channel switching unit 259. The control signal sampling/desampling unit 257 is used for sampling the first control such as I2C, CEC and VDD signals from source based on a sampling clock signal, converting the sampled first control signals into a first differential control signal, and sending the first differential control signal to the channel switching unit 259. It is noted that the sampling clock signal can be provided in several ways.

For example, the sampling clock signal can be provided by an external clock generator, or can be the differential clock signal CLK± provided by the HDMI source. In the exemplary embodiment shown in FIG. 4, the sampling clock signal is the differential clock signal CLK± provided by the HDMI source. Meanwhile, the sampling/desampling unit 257 also converts the received second differential control signal representing the return control signal from sink 220 into at least one second control signal, such as I2C and HPD, and transmits the desampled second control signal to the source 210. The channel switching unit 259 switches has three channels inside, wherein the first and second channels are utilized respectively for transmitting the differential clock signal CLK± and the first differential control signal, while the third channel is utilized for receiving the second differential control signal from the sink 220 through the CAT-5 cable.

The channel switching unit 259 selects one of three channels to couple to the CAT-5 cable by a switching control, whereby the differential clock signal, and the first differential control signal can be transmitted to the L4 lines of the CAT-5 cable, and the second differential control signal can be received from the L4 lines of the CAT-5 cable in a specific switching cycle. It is noted that switching cycle for switching each channel to transmit or receive signals to/from the L4 lines of the CAT-5 cable can be the varied according the need.

For example, the switching cycle alternatively selects the first channel for transmitting the differential clock signal, the second channel for transmitting the first differential control signal, and the third channel for receiving the second differential control signal in a sequence of the first channel, the second channel, the third channel, and such sequence is repeated periodically. Accordingly, the differential clock signal from the source 210 can be divided into a plurality of partial differential clock signals to be transmitted and restored at the remote RX module 260. Alternatively, the selected times for each channel in each switching cycle can be arranged differently from each other. For example, the sequence for selecting the channels in each switching cycle could be the first channel, the second channel, the first channel, the second channel, the third channel, and such sequence is repeated periodically. In the embodiment shown in FIG. 4, the sequence for selecting the channels in each switching cycle is the first channel, the second channel, the first channel, and the third channel. It is noted that the selecting channel sequence in each selecting period can be varied according to the user's need.

Figure 5:
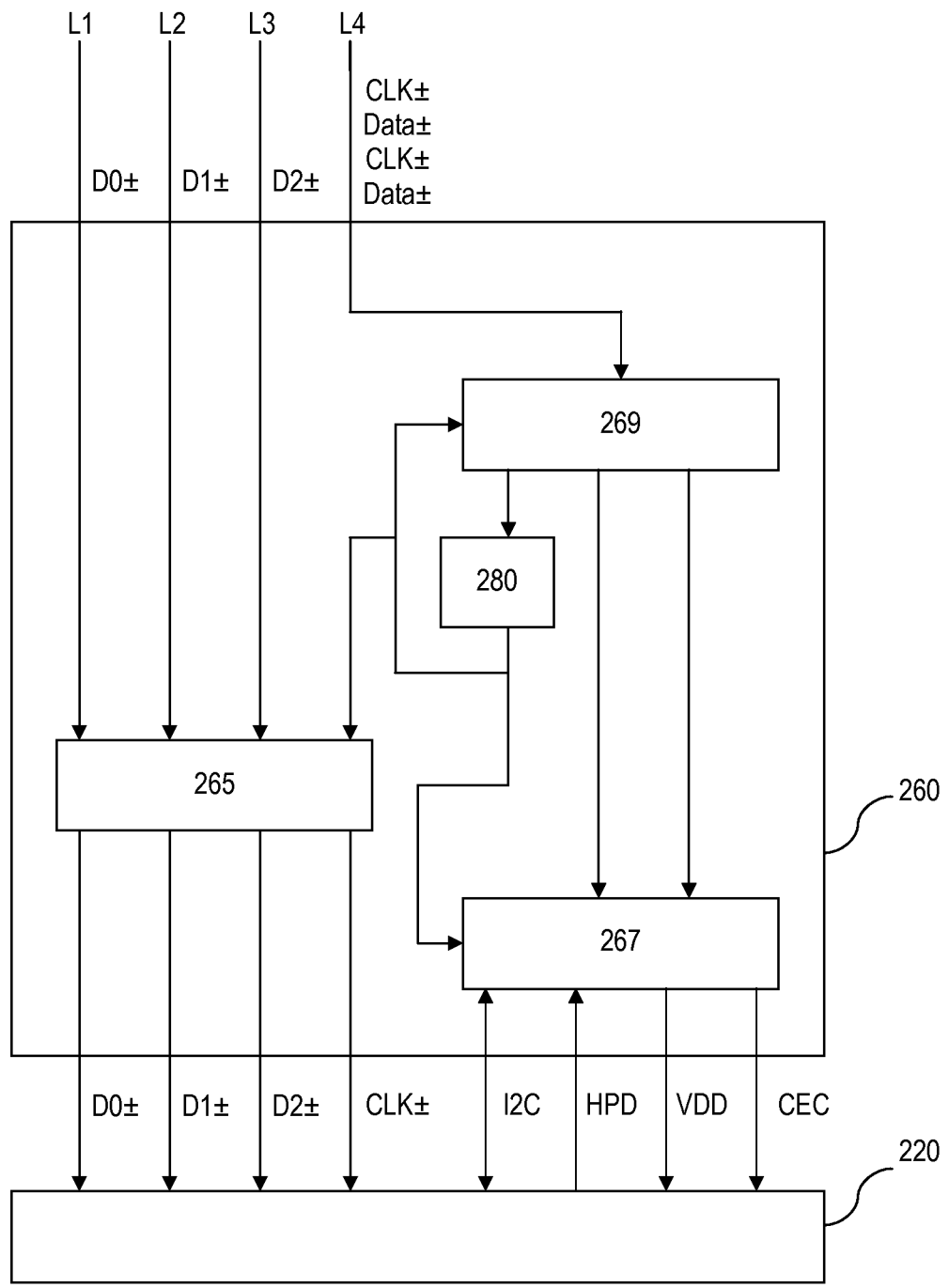
FIG. 5 is a block diagram illustrating an example of the RX module of the present invention embodiment shown in FIG. 2.

Referring to FIG. 5, there is shown a block diagram illustrating an example of the RX module 260 of the present invention embodiment shown in FIG. 2. RX module 260 has a TMDS processing unit 265, a control signal sampling/desampling unit 267, a channel switching unit 269 and a timing memory unit 280. The TMDS processing unit 265 may be a TMDS EQ or a TMDS high speed OP, and is used for processing the differential data signals D0±, D1± and D2± received the first three pairs of differential transmission lines L1, L2 and L3 of CAT-5 cable 274. Since there might be signal attenuation after a long distance transmission, the TMDS processing unit 265 is utilized to buffer and compensate the received differential signals D0±, D1± and D2±, and CLK±. The signal switching unit 269 alternatively receives the partial differential clock signal CLK±', the first differential control signals from the fourth pair of differential transmission lines L4 of CAT-5 cable 274, and sends a second differential control signal to the fourth pair of differential transmission lines L4 of CAT-5 cable 274. The signal switching unit 269 sends the partial differential clock signal CLK±' to the timing memory unit 280, sends the first differential control signals to the sampling/desampling unit 267, and receives the second differential control signals from the sampling/desampling unit 267. In this exemplary embodiment, each channel in the signal switching unit 269 is switched corresponding to each channel of the signal switching unit 259 so as to receive the first differential control signal, and partial differential clock signal, and transmit the second differential control signal correctly.

The control signal sampling/desampling unit 267 is used for sampling the at least one second control signal from the sink 220 based on a sampling clock. In this exemplary embodiment, the second control signals include an I2C and HPD signals. Likewise, the sampling clock for the sampling/desampling unit 267 can be provided by an external clock generator or, alternatively, the sampling clock can be the differential clock signals restored by the timing memory unit 280 according to the received partial differential clock signals. In this exemplary embodiment, the sampling clock is the differential clock signals restored by the timing memory unit 280. Meanwhile, the sampling/desampling unit 267 also converts the received first differential control signals into the first control signals such as I2C, VDD and CEC signals, and transmits the desampled first controls signals to the sink 220. It is noted that when the second differential control signals are transmitted from the sink 220 to source 210, they are first processed by the control signal sampling/desampling unit 267 of the RX module 260 and then by the control signal sampling/desampling unit 257 of the TX module 250.

The timing memory unit 280 receives the partial differential clock signal CLK±' and continuously replicates the partial differential clock signal CLK±' to reconstruct or revert the complete differential clock signal CLK±. The complete differential clock signal CLK± is sent to the TMDS processing unit 265 and transmitted together with the other differential data signals D0±, D1± and D2± to the sink 220. In this exemplary embodiment, the reconstructed differential clock signal is also transmitted to the signal switching unit 269 for providing timing signal in the operation.

It is noted that, in addition to transmitting by conventional synchronizing approaches where, for example, the time-divisional multiplexing (TDM) of a clock channel is synchronized to the sequences (i.e., the video channel periods) of the red, green and blue (RGB) video data channels, in the present invention the timing for alternatively transmitting the differential control signal and the partial differential clock signal and receiving the second differential control signal over the fourth pair of differential transmission lines is independent of, or asynchronized with, the timing for transmitting the multiple differential data signals over the first three pairs of differential transmission lines. Generally, differential data channel over L1, L2 or L3 can be divided into two time slots, wherein one time slot is for transmitting control data such as vertical synchronization signal, and the other time slot is for transmitting video data or audio data. Conventionally, the sequence of time slots over L1, L2 or L3 is synchronized to the time sequence for transmitting the partial differential clock, and differential control signal. In the present embodiment, the timing sequence for alternatively transmitting the differential control signal and the partial differential clock signal and receiving the second differential control signal is independent of the timing sequence for transmitting the multiple differential data signals over the first three pairs of differential transmission lines.

Figure 6:
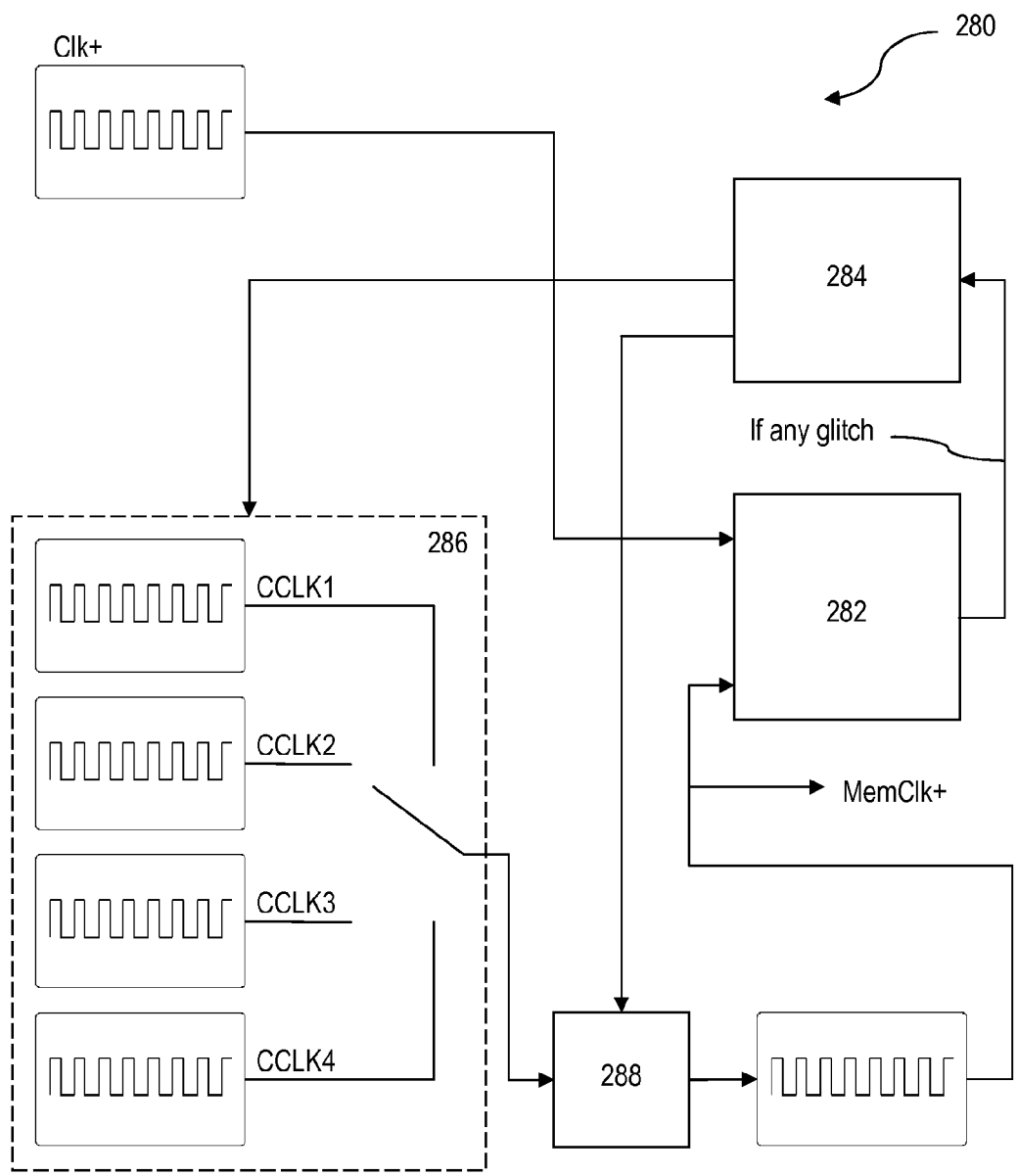
FIG. 6 is a block diagram illustrating an example of the timing memory unit of the RX module shown in FIG. 5.

Referring to FIG. 6, there is shown a block diagram illustrating an example of the timing memory unit 280 of the RX module 220 shown in FIG. 5. In this example, the timing memory unit 280 can be, but not limited to, an intelligent Field-Programmable Gate Arrays (FPGA) that has a controller unit 284, and a clock recovery circuit having a selection unit 286, a logic circuit 282, and a delay unit 288. The logic circuit 282 in this exemplary present embodiment is a XOR gate, but alternatively, the logic circuit 282 could also be an operation amplifier. When the XOR gate 282 receives the partial differential clock signal CLK±', the controller unit 284 will send a selection command to the selection unit 286 to control the selection unit 286 to select a selected differential clock signal from a multiplicity of candidate partial differential clock signals CCLK1, CCLK2, and so on Each candidate partial differential clock signal represents a data characteristic, which represents a specific image resolution in the present embodiment.

For example, CCLK1 represents 1080p image resolution, CCLK2 represents 1080i image resolution, CCLK3 represents 720p image resolution, and CCLK4 represents 720i image resolution. The multiplicity of differential clock signal candidates are memorized by and/or stored in the timing memory unit 280. Therefore, when the selection unit 286 receives the selection command from the controller unit 284, the selection unit 286 selects one of the candidate partial differential clock signals, and then outputs the selected corresponding differential clock signal to the logic circuit 282.

Thereafter, the logic circuit gate 282 will compare the phase of the partial differential clock signal CLK±' received from the channel switching unit 269, and the selected differential clock signal output by the selection unit 286, and sends a comparison result signal to the controller unit 284. If the comparison result signal indicating a mismatch in frequency, the controller unit 284 will send a delay command to the delay unit 288 so that the delay unit 288 will delay the selected differential clock signal.

Thereafter the logic circuit 282 can compare the phase of the delayed selected differential clock signal and received partial differential clock signal CLK±'. If the comparison result signal still indicates a mismatch after the delay module delays a specific length of phase, the controller unit 284 will issue another selection command to inform the selection unit 286 to select another differential clock signal from the plurality of candidate differential clock signals. If the comparison result signal indicate that the phase of the selected differential clock signal matches the phase of the partial differential clock signal, the timing memory unit 280 can replicate the partial differential clock signal CLK±' and revert the complete differential clock signal CLK±.

Alternatively, the controller can identify the frequency of the partial differential clock signal and determine the corresponding image resolution, thereby generating the selection command associated to the corresponding image resolution so that the selection unit could select the selected differential clock signal corresponding to the image resolution from the plurality of candidate differential clock signals.

Referring to FIGS. 7a, 7b and 7c, there are shown how the first and second differential control signals are processed so that they can be alternatively transmitted with the differential clock signal CLK±, using the I2C signal as an example, where FIG. 7a illustrates the source I2C signal before processed by the TX module of the signal extender system of the present invention, FIG. 7b illustrates the signal transmitted by the CAT-5 cable of the signal extender system of the present invention, and FIG. 7c illustrates the source I2C signal before processed by the RX module of the signal extender system of the present invention.

The exemplary embodiment shown in FIGS. 7a-7c represent that, for bi-direction control signal, the TX module can simulate I2C data of the sink and transmit the simulated I2C data of the sink to the source, and the RX module can also simulate the I2C data of the source and transmit the simulated I2C data of the source to the sink.

Referring to FIG. 7a, which illustrates a complete I2C data format in the source side during a cycle of communication between the source and the sink. When the source starts to communicate with the sink, according to the I2C specification, the source will issue a start bit with a physical address at first, and then wait for the acknowledgement signal (ACK) from the sink.

In this exemplary embodiment, unlike the conventional way, the TX module simulates an ACK message of the sink in order to force the source to provide data information, which is illustrated as (W) byte in FIG. 7a, to the TX module, whereby the TX module can sample and convert the "start bit, physical address, ACK (simulated), and (W) Byte" data into the first differential control signal shown in FIG. 7b.

Referring to FIG. 7c, when the RX module receives the first differential control signal, the RX module desamples the first differential control signal and simulates the "Start bit, physical address, (W) Byte" data according to the desampling result, and transmits the simulated data to the sink, whereby the sink can output its ACKs and (R) Byte data.

After the sink output the ACK and (R) byte data to the RX module, the RX module simulates an ACK message of the source and transmits it to the sink. Then the RX module samples and converts the ACK and (R) Byte data into a second differential control signal, which is illustrated in FIG. 7b, and transmits the second differential control signal to the TX module. When the TX module receives the second differential control signal ACK and (R) byte data, the TX module desamples the second differential control signal and simulates the second control signal according to the desampling result, and transmits the simulated second control signal to the source.

Referring to the FIG. 7a, viewing the complete communication cycle from the source side, while there is a blank between the (W) Byte and ACK message from the sink, as long as the blank time is controlled within a 2 ms timeout period, it is acceptable according to the Video Electronics Standards Association (VESA) standard. Accordingly, in order to achieve the long distance transmission for bi-direction signals such as I2C, the TX module can simulate response message such as the ACK message and (R) byte data of the sink, while the RX module can simulate the response message such as the ACK message and (W) byte data of the source, to complete a communication cycle of bi-direction signal.

Figure 8:
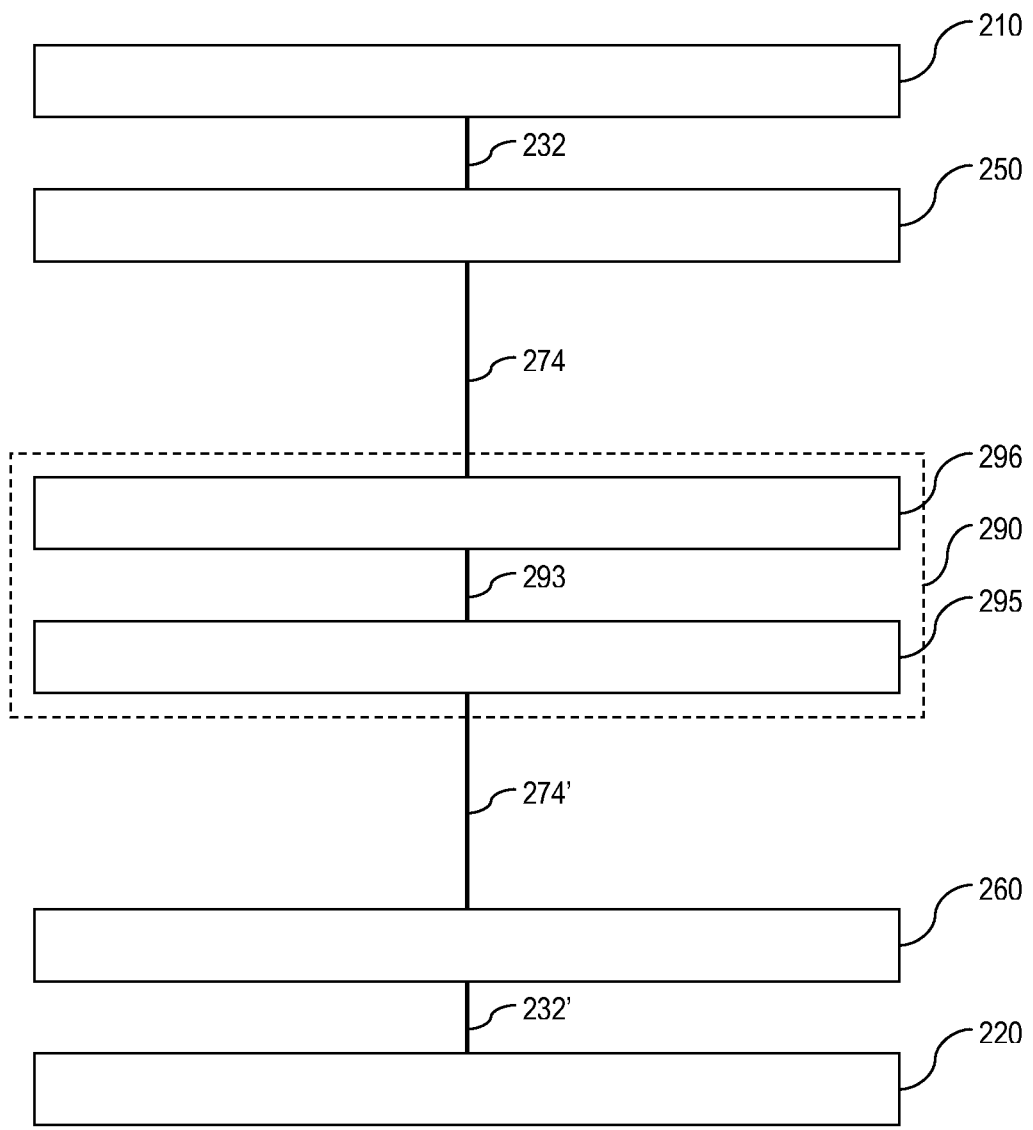
FIG. 8 is a block diagram illustrating another embodiment of the present invention HDMI signal extender system and extender thereof for transmitting digital A/V differential signals, using a repeater to increase the transmission distance.

Referring to FIG. 8, there is shown at 202 a block diagram illustrating another embodiment of the present invention multimedia signal extender system and extender thereof for transmitting digital A/V differential signals, using a repeater to increase the transmission distance. In the following exemplary embodiment, the multimedia signal extender system is a HDMI signal extender system. As discussed earlier, normally for 1,080P image data, the maximum length of a CAT-5 cable is about 120 ft for reliable signal transmission. When the source 210 and sink 220 are located further apart, a repeater 290 may be used between the TX module 250 and RX module 260 to increase the transmission distance. The repeater 290 includes an internal RX module 296 and an internal TX module 295 coupled by an HDMI cable 293. The internal RX module 296 is similarly configured as the RX module 260, and the internal TX module 295 is similarly configured as the TX module 250. A CAT-5 cable 274 is coupled between the TX module 250 and the internal RX module 296 of the repeater 290, and a CAT-5 cable 274' is coupled between the internal TX module 295 of the repeater and the RX module 260. For longer distance, more repeaters may be used in serial between the TX module 250 and RX module 260 in a similar arrangement as repeater 290.

Comparing to existing technologies, the present invention HDMI signal extender system and signal extender thereof have many advantages. It is designed to use only one CAT-5 cable between a TX module and an RX module of the extender system for transmitting HDMI A/V signals by sharing the fourth pair of transmission lines of the single CAT-5 cable with alternating transmission of the BD differential signals and a partial differential clock signal, and utilizes a timing memory unit to memorize the partial differential clock signal and continuously replicate the partial differential clock signal to revert the complete differential clock signal for output to the sink. This greatly simplifies the extender system and reduces the costs for HDMI A/V signal transmission. In addition, it provides a quick and easy way to extend the distance of HDMI A/V signal transmission by providing a series of repeaters between the TX and Rx modules of the extender system.

Although examples of the preferred embodiments of the present invention system and method are shown and described in detail above, the present invention is not limited to the specifics described herein. It will be apparent to those skilled in the art that various modification and variations can be made in the system and method of the present invention without departing from the spirit or scope of the invention. Thus, it is intended that the present invention cover modifications and variations that come within the scope of the appended claims and their equivalents.

What is claimed is:

1. A system for transmitting electronic signals from an electronic signal source device to an electronic signal sink device, comprising:
   a transmitting module coupled to the electronic signal source device for receiving a digital multimedia signal that includes multiple differential data signals, a differential clock signal and at least one first control signal, the transmitting module transforming the at least one first control signal into a first differential control signal, the transmitting module further including a first interface having a plurality pairs of first terminals;
   a receiving module coupled to the electronic signal sink device and having a timing memory unit, the receiving module including a second interface having a plurality pairs of second terminals coupled to the plurality pairs of first terminals respectively; and
   wherein the transmitting module transmits the first differential control signal and a partial differential clock signal which is part of the differential clock signal to a first pair of the first terminals in a switching cycle, and transmits the multiple differential data signals to the other pairs of the first terminals; and wherein the timing memory unit receives the partial differential clock signal, and continuously replicates the partial differential clock signal to revert a complete differential clock signal.

2. The system of claim 1, wherein the receiving module transforms at least one second control signal from the electronic signal sink device into a second differential control signal, and transmits the second differential control signal to a first pair of the second terminals coupled to the first pair of the first terminals, and the transmitting module further selects to receive the second differential control signal from the first pair of the first terminals in the switching cycle.

3. The system of claim 1, wherein the transmitting module comprises:
   a differential signal processing unit coupled to the electronic signal source device for receiving the multiple differential data signals and the differential clock signal from the electronic signal source device and processing the multiple differential data signals, and transmitting the processed multiple differential data signals to the first interface;
   a signal sampling/desampling unit coupled to the electronic signal source device, for receiving the at least one first control signal from the electronic signal source device, sampling the at least one first control signal based on a sampling clock signal, and transforming the sampled at least one first control signal into the first differential control signal; and
   a channel switching unit coupled to the differential signal processing unit, the signal sampling unit and the first pair of the first terminals, for receiving the differential clock signal form the differential signal processing unit and receiving the first differential control signal from the signal sampling unit, and switching between the differential clock signal and the first differential control signal in the switching cycle for transmitting the partial differential clock signal and the first differential control signal to the first pair of the first terminals.

4. The system of claim 3, wherein the sampling clock signal is the differential clock signal.

5. The system of claim 3, wherein the channel switching unit selects to receive a second differential control signal from the first pair of the first terminals in the switching cycle, and the signal sampling/desampling unit further transforms the second differential control signal into the at least one second control signal.

6. The system of claim 1, wherein the receiving module comprises:
   a channel switching unit coupled to the timing memory unit and the first pair of the second terminals, for selecting between the partial differential clock signal, and the first differential control signal in the switch cycle so as to receive the partial differential clock signal and the first differential control signal from the first pair of the second terminals, the channel switching unit sending the partial differential clock signal to the timing memory unit such that the timing memory unit can memorize the partial differential clock signal to revert the complete differential clock signal;
   a differential signal processing unit coupled to the electronic signal sink device, the timing memory unit and the first three pairs of differential transmission lines of the single cable, for receiving the reverted differential clock signal from the timing memory unit and receiving the multiple differential data signals from the first three pairs of differential transmission lines and processing the multiple differential data signals, and outputting the multiple differential data signals and the reverted differential clock signal to the electronic signal sink device; and a signal sampling/desampling unit coupled to the electronic signal sink device, and the channel switching unit, for receiving the first differential control signal from the channel switching unit and transforming the first differential control signal into the at least one first control signal, and outputting the at least one first control signal to the electronic signal sink device.

7. The system of claim 6, wherein the signal sampling/desampling unit receives a second control signal from the electronic signal sink device for sampling the second control signal based on a sampling clock signal, and transforming the sampled second control signal into the second differential control signal and outputting the second differential control signal to the first pair of the second terminals.

8. The system of claim 7, wherein the sampling clock signal is the differential clock signal.

9. The system of claim 1, wherein the timing memory unit further comprises:
a controller unit for generating a selection command, and a control command in response to a result signal; and
a clock recovery circuit, comprising:
a logic circuit, coupled to the controller unit for receiving the partial differential clock signal and the selected differential clock signal, the logic circuit comparing a phase of the partial differential clock signal and a phase of the selected differential clock signal and generating the result signal;
a selection unit for receiving the selection command and selecting the selected differential clock signal from the plurality of candidate differential signals; and
a delay unit coupled to the controller unit for delaying the phase of the selected differential clock signal upon receiving of the control command.

10. The system of claim 9, wherein the logic circuit is an XOR gate.

11. The system of claim 9, wherein the clock recovery circuit replicates the partial differential clock signal according to a result generated by comparing the received differential clock signal and a selected differential clock signal selected from a plurality of candidate differential clock signals each respectively corresponding to a data characteristic.

12. The system of claim 11, wherein the data characteristic is an image resolution.

13. The system of claim 1, wherein a timing sequence for alternatively transmitting the differential control signal and the partial differential clock signal to the first pair of the first terminals is independent of a timing sequence for transmitting the multiple differential data signals to the other pair of the first terminals.

14. The system of claim 1, wherein the transmitting module further simulates a response from the electronic signal sink device and transmits the response to the electronic signal source device such that the electronic signal source device can send a data to the transmitting module in response.

15. The system of claim 1, wherein a single cable having four pairs of differential transmission lines is coupled to the first interface and the second interface.

16. A system for transmitting electronic signals from an electronic signal source device to an electronic signal sink device, comprising:
a transmitting module coupled to the signal source device for receiving a digital multimedia signal that includes multiple differential data signals, a differential clock signal and at least one first control signal, the transmitting module transforming the at least one first control signal into a first differential control signal;
a repeater coupled between the transmitting module and a receiving module, and having an internal receiving module and an internal transmitting module coupled to each other;
a first cable having four pairs of differential transmission lines and coupled between the transmitting module and the internal receiving module of the repeater;
the receiving module coupled to the electronic signal sink device, the receiving module transforming at least one second control signal from the electronic signal sink device into a second differential control signal, and transmitting the second differential control signal over the fourth pair of differential transmission lines;
the receiving module and the internal receiving module of the repeater each having a timing memory unit;
a second cable having four pairs of differential transmission lines and coupled between the internal transmitting module of the repeater and the receiving module; and
wherein the transmitting module and the internal transmitting module of the repeater transmit the multiple differential data signals over the first three pairs of differential transmission lines, and transmits the first differential control signal and a partial differential clock signal which is part of the differential clock signal over the fourth pair of differential transmission lines, and receives the second differential control signal from the fourth pair of differential transmission lines in a switching cycle; and
wherein the timing memory unit receives the partial differential clock signal, and continuously replicates the partial differential clock signal to revert a complete differential clock signal.

17. The system of claim 16, wherein the timing memory unit replicates the partial differential clock signal according to a result generated by comparing the received differential clock signal and a selected differential clock signal selected from a plurality of candidate differential clock signals each respectively corresponding to a data characteristic.

18. The system of claim 16, wherein the transmitting module and the internal transmitting module of the repeater each comprises:
a differential signal processing unit coupled to the source device and the first three pairs of differential transmission lines, for receiving the multiple differential data signals and the differential clock signal from the source device and processing the multiple differential data signals, and transmitting the processed multiple differential data signals over the first three pairs of differential transmission lines;
a signal sampling unit coupled to the source device, for receiving the at least one first control signal from the source device and sampling the at least one first control signal based on a sampling clock signal, and transforming the sampled at least one first control signal into the first differential control signal, the signal sampling/desampling unit further transforming the second differential control signal into the at least one second control signal; and
a channel switching unit coupled to the differential signal processing unit, the signal sampling unit and the fourth pair of the differential transmission lines, for receiving the differential clock signal form the differential signal processing unit and receiving the first differential control signal from the signal sampling unit, and switching between the differential clock signal, the first differential control signal, and the second differential control signal in the switching cycle for transmitting the partial differential clock signal and the first differential control signal over the fourth pair of the differential transmission lines and receiving the second differential control signal transmitted over the fourth pair of the differential transmission lines.

19. The system of claim 16, wherein the receiving module and the internal receiving module of the repeater each comprises:
   a channel switching unit coupled to the timing memory unit and the fourth pair of the differential transmission lines, for receiving the partial differential clock signal and the first differential control signal, transmitting the second differential control signal over the fourth pair of differential transmission lines, and sending the partial differential clock signal to the timing memory unit such that the timing memory unit can memorize the partial differential clock signal to revert the complete differential clock signal;
   a differential signal processing unit coupled to the electronic signal sink device, the timing memory unit and the first three pairs of differential transmission lines, for receiving the reverted differential clock signal from the timing memory unit and receiving the multiple differential data signals from the first three pairs of differential transmission lines and processing the multiple differential data signals, and outputting the multiple differential data signals and the reverted differential clock signal to the electronic signal sink device; and
   a signal sampling/desampling unit coupled to the electronic signal sink device, and the channel switching unit, for receiving the first differential control signal from the channel switching unit, and receiving the second control signal from the sink for sampling the second control signal based on a sampling clock signal, and transforming the sampled second control signal into the second differential control signal, the signal sampling/desampling unit transforming the first differential control signal into the at least one first control signal, and outputting the at least one first control signal to the electronic signal sink device.

20. The system of claim 16, wherein the timing memory unit further comprises:
   a controller unit for generating a selection command, and a control command in response to a result signal; a logic circuit, coupled to the controller unit for receiving the partial differential clock signal, and the selected differential clock signal, the logic circuit comparing a phase of the partial differential clock signal and a phase of the selected differential clock signal and generating the result signal;
   a selection unit for receiving the selection command and selecting the selected differential clock signal from the plurality of candidate differential signals; and
   a delay unit coupled to the controller unit for delaying the phase of the selected differential clock signal upon receiving the control command.

21. The system of claim 20, wherein the logic circuit is a XOR gate.

22. The system of claim 17, wherein the data characteristic is an image resolution.

23. The system of claim 17, wherein the timing for alternatively transmitting the differential control signal and the partial differential clock signal and receiving the second differential control signal is independent of the timing for transmitting the multiple differential data signals over the first three pairs of differential transmission lines.

24. The system of claim 18, wherein the sampling clock signal is the differential clock signal.

25. A transmitting module for transmitting electronic signals from an electronic signal source device to an electronic signal sink device, comprising:
   a first interface, for receiving a digital multimedia signal including multiple differential data signals, a differential clock signal and at least one first control signal, wherein the multiple differential data signals and the differential clock signal each is characterized by consisting of two opposite signals; and
   a second interface including a plurality pairs of terminals;
   wherein the transmitting module transforms the at least one first control signal into a first differential control signal, transmits the first differential control signal and a partial differential clock signal which is part of the differential clock signal to a first pair of the terminals in a switching cycle so that the first differential control signal and the partial differential clock signal are transmitted alternatively in a sequence which is repeated periodically, and transmits the multiple differential data signals to the other pairs of the terminals.

26. The transmitting module of claim 25, further comprising:
   a differential signal processing unit coupled to the electronic signal source device for receiving the multiple differential data signals and the differential clock signal from the electronic signal source device and processing the multiple differential data signals, and transmitting the processed multiple differential data signals to the first interface;
   a signal sampling/desampling unit coupled to the electronic signal source device, for receiving the at least one first control signal from the electronic signal source device, sampling the at least one first control signal based on a sampling clock signal, and transforming the sampled at least one first control signal into the first differential control signal; and
   a channel switching unit coupled to the differential signal processing unit, the signal sampling unit and the first pair of the first terminals, for receiving the differential clock signal form the differential signal processing unit and receiving the first differential control signal from the signal sampling unit, and switching between the differential clock signal and the first differential control signal in the switching cycle for transmitting the partial differential clock signal and the first differential control signal to the first pair of the first terminals.

27. The transmitting module of claim 26, wherein the channel switching unit selects to receive a second differential control signal from the first pair of the first terminals in the switching cycle, and the signal sampling/desampling unit further transforms the second differential control signal into the at least one second control signal.

28. The transmitting module of claim 25, wherein a timing sequence for alternatively transmitting the differential control signal and the partial differential clock signal to the first pair of the first terminals is independent of a timing sequence for transmitting the multiple differential data signals to the other pair of the first terminals.

29. The transmitting module of claim 25, further simulating a response from the electronic signal sink device and transmits the response to the electronic signal source device such that the electronic signal source device can send a data to the transmitting module in response.

30. A receiving module for receiving electronic signals from an electronic signal source device and transmitting to an electronic signal sink device, comprising:
- a first interface including a plurality pairs of terminals, the first interface receiving a first differential control signal and a partial differential clock signal which is part of a differential clock signal from a first pair of the terminals, and receiving multiple differential data signals from the other pairs of the terminals;
- a second interface for outputting a digital multimedia signal including the multiple differential data signals, the differential clock signal and at least one first control signal; and
- a timing memory unit, for receiving the partial differential clock signal, and continuously replicates the partial differential clock signal to revert the differential clock signal;
- wherein the receiving module receives the first differential control signal and the partial differential clock signal from the first pair of the terminals in a switching cycle, and transforms the first differential control signal into the at least one first control signal.

31. The receiving module of claim 30, further transforming at least one second control signal from the electronic signal sink device into a second differential control signal, and transmitting the second differential control signal to a first pair of the second terminals coupled to the first pair of the first terminals.

32. The receiving module of claim 30, further comprising:
- a channel switching unit coupled to the timing memory unit and the first pair of the second terminals, for selecting between the partial differential clock signal, and the first differential control signal in the switch cycle so as to receive the partial differential clock signal and the first differential control signal from the first pair of the second terminals, the channel switching unit sending the partial differential clock signal to the timing memory unit such that the timing memory unit can memorize the partial differential clock signal to revert the complete differential clock signal;
- a differential signal processing unit coupled to the electronic signal sink device, the timing memory unit and the first three pairs of differential transmission lines of the single cable, for receiving the reverted differential clock signal from the timing memory unit and receiving the multiple differential data signals from the first three pairs of differential transmission lines and processing the multiple differential data signals, and outputting the multiple differential data signals and the reverted differential clock signal to the electronic signal sink device; and
- a signal sampling/desampling unit coupled to the electronic signal sink device, and the channel switching unit, for receiving the first differential control signal from the channel switching unit and transforming the first differential control signal into the at least one first control signal, and outputting the at least one first control signal to the electronic signal sink device.

33. The receiving module of claim 32, wherein the signal sampling/desampling unit receives a second control signal from the electronic signal sink device for sampling the second control signal based on a sampling clock signal, and transforming the sampled second control signal into the second differential control signal and outputting the second differential control signal to the first pair of the second terminals.

34. The receiving module of claim 30, wherein the timing memory unit further comprises:
- a controller unit for generating a selection command, and a control command in response to a result signal; and
- a clock recovery circuit, comprising:
  - a logic circuit, coupled to the controller unit for receiving the partial differential clock signal and the selected differential clock signal, the logic circuit comparing a phase of the partial differential clock signal and a phase of the selected differential clock signal and generating the result signal;
  - a selection unit for receiving the selection command and selecting the selected differential clock signal from the plurality of candidate differential signals; and
  - a delay unit coupled to the controller unit for delaying the phase of the selected differential clock signal upon receiving of the control command.

35. The receiving module of claim 34, wherein the clock recovery circuit replicates the partial differential clock signal according to a result generated by comparing the received differential clock signal and a selected differential clock signal selected from a plurality of candidate differential clock signals each respectively corresponding to a data characteristic.

* * * * *